US007412001B2

(12) United States Patent
Dufour et al.

(10) Patent No.: US 7,412,001 B2
(45) Date of Patent: Aug. 12, 2008

(54) VIDEO CODING METHOD AND CORRESPONDING TRANSMITTABLE VIDEO SIGNAL

(75) Inventors: Cecile Dufour, Paris (FR); Gwenaelle Marquant, Paris (FR); Stephane Edouard Valente, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 1004 days.

(21) Appl. No.: 10/270,334

(22) Filed: Oct. 11, 2002

(65) Prior Publication Data
US 2003/0128757 A1 Jul. 10, 2003

(30) Foreign Application Priority Data
Oct. 16, 2001 (EP) .................... 01402667

(51) Int. Cl.
*H04N 7/12* (2006.01)
(52) U.S. Cl. ............................. 375/240.08
(58) Field of Classification Search ............... 348/554, 348/565, 715, 571, 387.1, 563, 721, 461, 348/845.3, 423; 375/240.25, 240.12, 240.24, 375/240.23, 240.08, 240.01, 240.16, 240.29; 382/232, 233, 234, 235, 236, 196
See application file for complete search history.

(56) References Cited

U.S. PATENT DOCUMENTS 6,636,222 B1 * 10/2003 Valmiki et al. ............. 345/505
6,934,333 B1 * 8/2005 Plissonneau et al. ... 375/240.16
2002/0136306 A1 * 9/2002 Frojdh et al. ............ 375/240.23
2003/0138050 A1 * 7/2003 Yamada et al. .......... 375/240.25
2005/0089091 A1 * 4/2005 Kim et al. ............... 375/240.01

OTHER PUBLICATIONS

Information technology, coding of audio-visual objects, Dec. 1999, version 1.*
Thomas Sikora, The MPEG-4 Video Standard Verification Model 1997, IEEE, 7, 19-31.*
International Organization For Standardisation: "Information Technology—Generic Coding Of Audio-Visual Objects: Visual ISO/IEC 14496-2/AMD X" ISO/IEC JTC1/WG11 N3095, XX, XX, Dec. 1999, pp. 3-27.
Lippman, et al: "Single-Channel Backward-Compatible EDTV Systems" SMPTE Journal, vol. 98, No. 1, Jan. 1, 1998, pp. 14-19.

* cited by examiner

*Primary Examiner*—Tung Vo
*Assistant Examiner*—Behrooz Senfi

(57) ABSTRACT

The invention relates to a video coding method applied to a sequence of video frames and generating a coded bitstream constituted of video data that represent all the video object planes and are described in terms of separate channels. In said video data, each data item is described by means of a bitstream syntax allowing any decoder to recognize and decode all the segments of the content of said bitstream. The temporal resolution of the sequence is described by means of some specific syntactic elements. According to the invention, which finds an application for instance within the video compression standards of the MPEG family, the syntax also comprises specific flags for describing, in the coded bitstream, the maximum frame rate of each described channel.

4 Claims, 1 Drawing Sheet

VIDEO CODING METHOD AND CORRESPONDING TRANSMITTABLE VIDEO SIGNAL

FIELD OF THE INVENTION

The present invention generally relates to the field of video compression and, for instance, more particularly to the video coding standards of the MPEG family (MPEG-1, MPEG-2, MPEG-4) and of the ITU-H.26X family (H.261, H.263 and extensions, H.26L). More specifically, this invention concerns a video coding method applied to a sequence of video frames corresponding to successive scenes and generating, for coding all the video objects of said scenes, a coded bitstream constituted of video data that represent all the successive, coded video object planes (VOPs) and in which each data item is described by means of a bitstream syntax allowing to recognize and decode all the segments of the content of said bitstream, the video data being described in terms of separate channels comprising at least one channel, and the temporal resolution of said sequence being specifically described by means of syntactic elements which respectively define:

a first number of evenly spaced sub-intervals per second, called "ticks";
second number of ticks between the successive VOPs in the display order;
flag indicating whether or not all VOPs are coded with a fixed VOP temporal rate, the VOP rate being then derived either from said second number when it is fixed or from time stamps provided in each VOP header when it is variable.

The invention also relates to a transmittable video signal consisting of a coded bitstream generated by means of the implementation of said coding method, and to a decoding method and a decoding device for decoding said signal.

BACKGROUND OF THE INVENTION

In the first video coding standards (up to MPEG-2 and H.263), the video is assumed to be rectangular and to be described in terms of three separate channels: one luminance channel and two chrominance channels. With MPEG-4, additional channels have been introduced, for example the alpha channel (also referred to as the "arbitrary shape channel" in MPEG-4 terminology), the disparity channel, or the depth channel. The spatial and temporal resolutions of these channels are described at the sequence level (Video Object Layer, or VOL, in MPEG-4 terminology).

For the frame rate, only one description is given for all channels, as follows. The temporal resolution of the sequence is described by means of the following syntactic elements:

"vop_time_increment_resolution" (coded on 16 bits),
"fixed_vop_rate" (coded on 1 bit), and
"fixed_vop_time_increment" (coded on 1 to 16 bits), as defined for instance in pages 36 and 112 of the MPEG-4 document w3056, "Information Technology—Coding of audio-visual objects—Part 2: Visual", ISO/IEC/JTC1/SC29/WG11, Maui, USA, December 1999. These elements are now described in a more detailed manner.

The syntactic element "vop_time_increment_resolution" is a 16 bit unsigned integer that indicates the number of evenly spaced subintervals, called ticks, within one modulo time (modulo time represents the fixed interval of one second).

The syntactic element "fixed_vop_time_increment" represent the number of ticks between two successive VOPs in the display order. The length of a tick, given by "vop_time_increment_resolution", can take a value in the range [0, vop_time_increment_resolution]. The number of bits representing said value is calculated as the minimum number of unsigned integer bits required to represent the above range. This element "fixed_vop_time_increment" is only found in the bitstream if "fixed_vop_rate" is "1", and its value must be identical to the constant given by the distance between the display time of any two successive VOPs in the display order. In this case, the fixed VOP rate is given as the ratio "vop_time_increment_resolution"/"fixed_vop_time_increment", a zero value being forbidden.

The syntactic element "fixed_vop_rate" is a one-bit flag which indicates that all VOPs (pictures in MPEG-4 terminology) are coded with a fixed VOP temporal rate. Its value is "1" if and only if all the distances between the display time of any two successive VOPS in the display order in the video object layer are constant. In this case, the VOP rate can be derived from the "fixed_vop_time_increment" syntactic element. If the value of the flag is "0", the display time between any two successive VOPs in the display order can be variable: it is then indicated by the time stamps provided in the VOP header.

In either case (fixed VOP rate or not), the display time of each encoded VOP is retrieved from the bitstream by a syntactic element "vop_time_increment" coded on 1 to 16 bits in the VOP header (see pp. 40 and 120 of the MPEG-4 document already cited). It can take a value in the range of [0, vop_time_increment_resolution]. The number of bits representing said value is calculated as the minimum number of unsigned integer bits required to represent the above range. The local time base in the units of seconds is recovered by dividing this value by "vop_time_increment_resolution".

From the previous indications, it can be seen that, unfortunately, all channels have to share the same description. It is not possible to describe, for instance, a video sequence encoded at a frame rate of 30 Hz in luminance, 15 Hz in chrominance and 10 Hz in shape.

SUMMARY OF THE INVENTION

It is therefore an object of the invention to propose a video coding method allowing to describe a video sequence with channels that have different frame rates.

To this end, the invention relates to a method such as defined in the introductory part of the description and which is moreover characterized in that said syntax also includes specific flags for describing, in the coded bitstream to be transmitted and/or stored, the maximum frame rate of each described channel.

It is also an object of the invention to propose a transmittable video signal consisting of a coded bitstream generated by means of the implementation of a video coding method applied to a sequence of video frames corresponding to successive scenes and generating, for coding all the video objects of said scenes, a coded bitstream constituted of video data that represent all the successive, coded video object planes (VOPs) and in which each data item is described by means of a bitstream syntax allowing any decoder to recognize and decode all the segments of the content of said bitstream, the video data being described in terms of separate channels comprising at least one channel, and the temporal resolution of said sequence being specifically described by means of syntactic elements which respectively define:

a first number of evenly spaced sub-intervals per second, called "ticks";
a second number of ticks between the successive VOPs in the display order;

a flag indicating whether or not all VOPs are coded with a fixed VOP temporal rate, the VOP rate being then derived either from said second number when it is fixed or from time stamps provided in each VOP header when it is variable;

said transmittable video signal including specific flags for describing, in the coded bitstream intended to be transmitted and/or stored, the maximum frame rate of each described channel.

The invention also relates to a video decoding method provided for receiving and decoding a A transmittable video signal consisting of a coded bitstream generated by means of the implementation of a video coding method applied to a sequence of video frames corresponding to successive scenes and generating, for coding all the video objects of said scenes, a coded bitstream constituted of video data that represent all the successive, coded video object planes (VOPs) and in which each data item is described by means of a bitstream syntax allowing any decoder to recognize and decode all the segments of the content of said bitstream, the video data being described in terms of separate channels comprising at least one channel, and the temporal resolution of said sequence being specifically described by means of syntactic elements which respectively define:

a first number of evenly spaced sub-intervals per second, called "ticks";

a second number of ticks between the successive VOPs in the display order;

a flag indicating whether or not all VOPs are coded with a fixed VOP temporal rate, the VOP rate being then derived either from said second number when it is fixed or from time stamps provided in each VOP header when it is variable;

said transmittable video signal including specific flags for describing, in the coded bitstream intended to be transmitted and/or stored, the maximum frame rate of each described channel.

The invention also relates to a corresponding decoding device.

DETAILED DESCRIPTION OF THE INVENTION

In the following description, it is assumed that the presence of channels is described by several syntactic elements at the sequence level (or VOL), these elements being for example:

| | |
|---|---|
| Video_object_layer_lum | 1 bit |
| Video_object_layer_chrom | 1 bit (0 for black and white) |
| Video_object_layer_shape | 1 bit (0 for rectangular) |
| Video_object_layer_additional_channels | 1 bit |
| Number_of_additional_channels | 4 bits |

These syntactic elements should be read as follows:

if "Video_object_layer_lum" is 1, it means that the bitstream contains syntactic elements for a luminance channel;

if "Video_object_layer_chrom" is 1, the bitstream contains syntactic elements for the chrominance channels, else the sequence is assumed to be black and white;

if "Video_object_layer_shape" is 1, the bitstream contains syntactic elements intented to describe a non-rectangular shape for the picture, else the shape of the picture is assumed to be rectangular;

if "Video_object_layer_additional_channels_enable" is 1, the bitstream contains syntactic elements describing additional channels (in such a case, the variable "Number_additional_channels" holds the number of additional channels).

The proposed solution is then based on the introduction, at a high description level (equivalent to VOL MPEG-4 level), of the flag of Table 1, for describing the maximum frame rate of individual channels with reference to a global time base:

TABLE 1

| Element | Type | Semantic |
|---|---|---|
| Vol_time_increment_resolution | 16 bits | Global time increment resolution |
| Vol_time_increment_resolution_lum_ratio | 4 bits | Ratio between global time increment and luminance channel time increment resolution |
| Vol_time_increment_resolution_chrom_ratio | 3 bits | Ratio between global time increment and chrominance channel time increment resolution |
| Vol_time_increment_resolution_channels ratio [i] | 4 bits | Ratio between global time increment and $i^{th}$ additional channel time increment resolution |
| Vol_time_increment_resolution_lum | Integer | Luminance channel time increment resolution |
| Vol_time_increment_resolution_chrom | Integer | Chrominance channel time increment resolution |
| Vol_time_increment_resolution_channels [i] | Integer | $i^{th}$ additional channel time increment resolution |

BRIEF DESCRIPTION OF THE DRAWING

The invention will now be described in a more detailed manner, with reference to the accompanying drawing in which.

Figure 1:
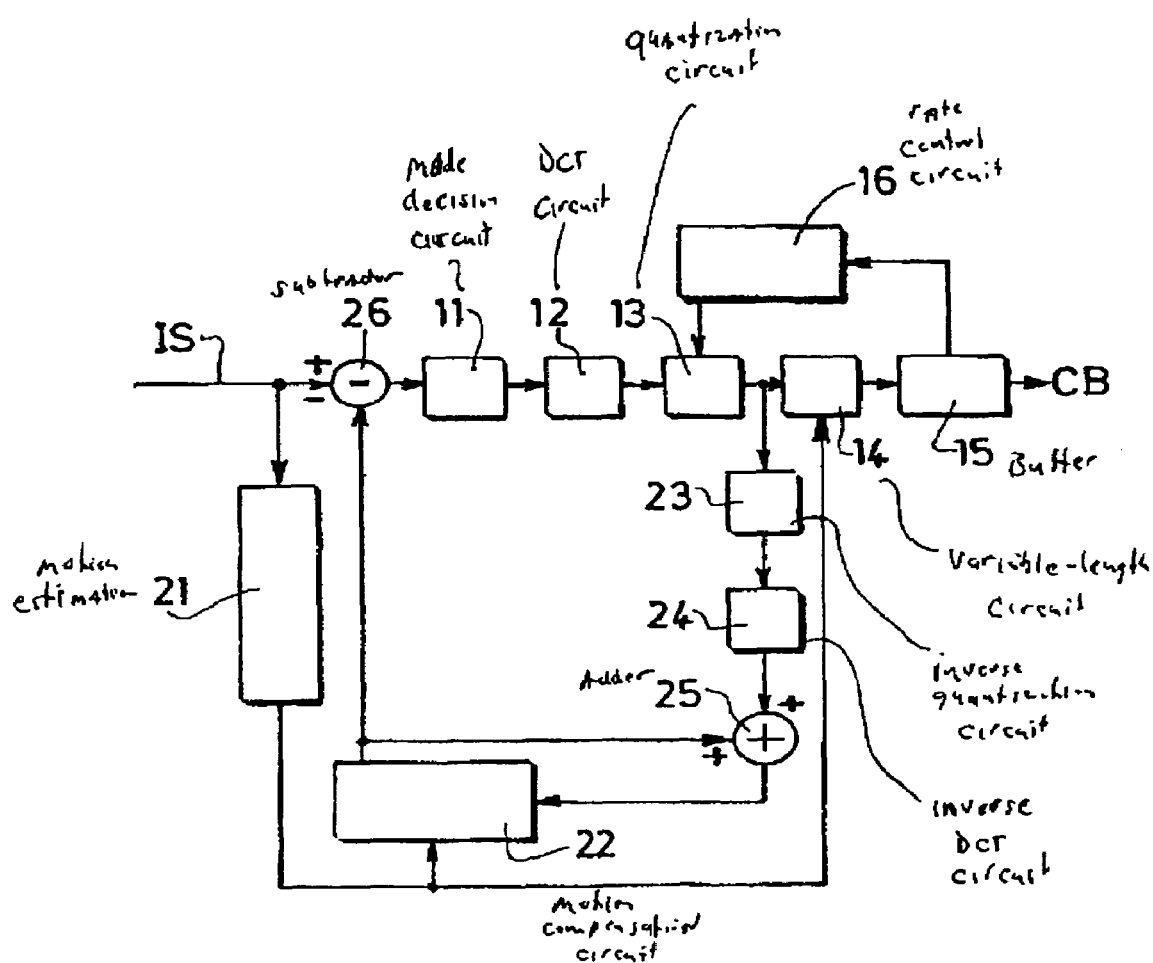
FIG. 1 shows an example of an MPEG coder with motion compensated interframe prediction.

These syntactic elements can be read from the bitstream, using the next pseudo C-code, which expresses the relationships between the channel presence and the availability of the syntactic elements. The function read_bits(n) returns the next unread "n" bits from the bitstream, and the default value of the syntactic element is 0:

```
Vol_time_increment_resolution = read_bits (16);
If (Video_object_layer_lum)
    {
    Vol_time_increment_resolution_lum_ratio = read_bits (4);
    If (Video_object_layer_chrom)
```

```
        Vol_time_increment_resolution_chrom_ratio = read_bits (3);
    }
If (Video_object_layer_additional_channels)
    {
        For i = 0; i < number_of_additional_channels; i++)
        Vol_time_increment_resolution_channels_ratio[i]=readbits(4)
    }
Vol_time_increment_resolution_lum =
Vol_time_increment_resolution / (Vol_time_increment_resolution_chrom_ratio + 1);
Vol_time_increment_resolution_chrom =
Vol_time_increment_resolution / (Vol_time_increment_resolution_chrom_ratio + 1);
Vol_time_increment_resolution_channels[i] =
Vol_time_increment_resolution/(Vol_time_increment_resolution_channels_ratio[i]+1)
```

An example of implementation may be given. A sequence of the type CIF 4:2:2, encoded at a frame rate of 15 Hz in luminance and 10 Hz in chrominance, with binary shape at 30 Hz, would be described by the following parameters:

| Channels presence description: | |
|---|---|
| Video_object_layer_lum | 1 |
| Video_object_layer_chrom | 1 |
| Video_object_layer_additional_channels | 1 |
| Number_of_additional_channels | 1 |
| Video_object_layer_shape | 1 |
| Format per channels descriptions: | |
| Vol_time_increment_resolution | 30 in decimal |
| Vol_time_increment_resolution_lum_ratio | 0001 |
| Vol_time_increment_resolution_chrom_ratio | 0010 |
| Vol_time_increment_resolution_shape_ratio | 0000 |

The video coding method described above may be implemented in a coding device such as for instance the one illustrated in FIG. 1 showing an example of an MPEG coder with motion compensated interframe prediction, said coder comprising coding and prediction stages. The coding stage itself comprises in series a mode decision circuit 11 (for determining the selection of a coding mode I, P or B as defined in MPEG), a DCT circuit 12, a quantization circuit 13, a variable-length coding circuit 14 and a buffer 15 associated to a rate control circuit 16 for adapting the quantization according to the content of the buffer. The prediction stage comprises in series a motion estimation circuit 21 followed by a motion compensation circuit 22, and, in series, an inverse quantization circuit 23, an inverse DCT circuit 24 and an adder 25. A subtractor 26 allows to send towards the coding stage (11 to 16) the difference between the input signal IS of the coding device and the predicted signal available at the output of the prediction stage (i.e. at the output of the motion compensation circuit 22). This difference, or residual, is the bitstream that is coded, and the output signal CB of the buffer 15 is the coded bitstream that, according to the invention, will include the syntactic element indicating at a high description level, for each channel described in the coded bitstream, the presence, or not, of an encoded residual signal.

Another example of coding device may be based on the specifications of the MPEG-4 standard. In the MPEG-4 video framework, each scene, which may consist of one or several video objects (and possibly their enhancement layers), is structured as a composition of these objects, called Video Objects (VOs) and coded using separate elementary bitstreams. The input video information is therefore first split into VOs by means of a segmentation circuit, and these VOs are sent to a basic coding structure that involves shape coding, motion coding and texture coding. Each VO is, in view of these coding steps, divided into macroblocks, that consist for example in four luminance blocks and two chrominance blocks for the format 4:2:0 and are encoded one by one. According to the invention, the multiplexed bitstream including the coded signals that result from said coding steps will include the specific flags for describing, in the coded bitstream to be transmitted and/or stored, the maximum frame rate of each described channel.

Reciprocally, according to a corresponding decoding method, these specific flags, transmitted to the decoding side, are read by appropriate means in a video decoder receiving the coded bitstream that includes said flags and carrying out said decoding method. The decoder, which is able to recognize and decode all the segments of the content of the coded bitstream, reads said additional syntactic elements and knows the maximum frame rate of each described channel. Such a decoder may be of any MPEG-type, as the encoding device, and its essential elements are for instance, in series, an input buffer receiving the coded bitstream, a VLC decoder, an inverse quantizing circuit and an inverse DCT circuit. Both in the coding and decoding device, a controller may be provided for managing the steps of the coding or decoding operations.

The foregoing description of the preferred embodiments of the invention has been presented for purposes of illustration and description. It is not intended to be exhaustive or to limit the invention to the precise forms disclosed, and obviously modifications and variations, apparent to a person skilled in the art and intended to be included within the scope of this invention, are possible in light of the above teachings.

It may for example be understood that the coding and decoding devices described herein can be implemented in hardware, software, or a combination of hardware and software, without excluding that a single item of hardware or software can carry out several functions or that an assembly of items of hardware and software or both carry out a single function. The described methods and devices may be implemented by any type of computer system or other adapted apparatus. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized.

The present invention can also be embedded in a computer program product, which comprises all the features enabling the implementation of the methods and functions described herein and—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The invention claimed is:

1. A video coding method applied to a sequence of video frames corresponding to successive scenes and generating, for coding all the video objects of said scenes, a coded bitstream constituted of video data that represent all the successive, coded video object planes (VOPs) and in which each data item is described by means of a bitstream syntax allowing to recognize and decode all the segments of the content of said bitstream, the video data being described in terms of separate channels, and the temporal resolution of said sequence being specifically described by means of syntactic elements which respectively define:
   a first number of evenly spaced sub-intervals per second, called "ticks";
   a second number of ticks between the successive VOPs in the display order;
   a flag indicating whether or not all VOPs are coded with a fixed VOP temporal rate, the VOP rate being then derived either from said second number when it is fixed or from time stamps provided in each VOP header when it is variable;
said syntax also including specific flags for each channel to describe, in the coded bitstream to be transmitted and/or stored, the maximum frame rate, wherein said maximum frame rate of each channel is described by reference to a global time reference base.

2. A transmittable video signal consisting of a coded bitstream generated by means of the implementation of a video coding method applied to a sequence of video frames corresponding to successive scenes and generating, for coding all the video objects of said scenes, a coded bitstream constituted of video data that represent all the successive, coded video object planes (VOPs) and in which each data item is described by means of a bitstream syntax allowing any decoder to recognize and decode all the segments of the content of said bitstream, the video data being described in terms of separate channels, and the temporal resolution of said sequence being specifically described by means of syntactic elements which respectively define:
   a first number of evenly spaced sub-intervals per second, called "ticks";
   a second number of ticks between the successive VOPs in the display order;
   a flag indicating whether or not all VOPs are coded with a fixed VOP temporal rate, the VOP rate being then derived either from said second number when it is fixed or from time stamps provided in each VOP header when it is variable;
said transmittable video signal including specific flags for each channel to describe, in the coded bitstream to be transmitted and/or stored, the maximum frame rate, wherein said maximum frame rate of each channel is described by reference to a global time reference base.

3. A video decoding method provided for receiving and decoding a transmittable video signal consisting of a coded bitstream generated by means of the implementation of a video coding method applied to a sequence of video frames corresponding to successive scenes and generating, for coding all the video objects of said scenes, a coded bitstream constituted of video data that represent all the successive, coded video object planes (VOPs) and in which each data item is described by means of a bitstream syntax allowing any decoder to recognize and decode all the segments of the content of said bitstream, the video data being described in terms of separate channels, and the temporal resolution of said sequence being specifically described by means of syntactic elements which respectively define:
   a first number of evenly spaced sub-intervals per second, called "ticks";
   a second number of ticks between the successive VOPs in the display order;
   a flag indicating whether or not all VOPs are coded with a fixed VOP temporal rate, the VOP rate being then derived either from said second number when it is fixed or from time stamps provided in each VOP header when it is variable;
said transmittable video signal including specific flags for each channel to describe, in the coded bitstream to be transmitted and/or stored, the maximum frame rate, wherein said maximum frame rate of each channel is described by reference to a global time reference base.

4. A video decoding device for decoding a transmittable video signal consisting of a coded bitstream generated by means of the implementation of a video coding method applied to a sequence of video frames corresponding to successive scenes and generating, for coding all the video objects of said scenes, a coded bitstream constituted of video data that represent all the successive, coded video object planes (VOPs) and in which each data item is described by means of a bitstream syntax allowing any decoder to recognize and decode all the segments of the content of said bitstream, the video data being described in terms of separate channels, and the temporal resolution of said sequence being specifically described by means of syntactic elements which respectively define:
   a first number of evenly spaced sub-intervals per second, called "ticks";
   a second number of ticks between the successive VOPs in the display order;
   a flag indicating whether or not all VOPs are coded with a fixed VOP temporal rate, the VOP rate being then derived either from said second number when it is fixed or from time stamps provided in each VOP header when it is variable;
said transmittable video signal including specific flags for each channel to describe, in the coded bitstream to be transmitted and/or stored, the maximum frame rate, wherein said maximum frame rate of each channel is described by reference to a global time reference base.

* * * * *